United States Patent [19]
Brown

[11] 3,910,113
[45] Oct. 7, 1975

[54] METHOD OF SELECTIVELY VARYING THE DIFFERENTIAL OUTPUT AND OVERALL PERFORMANCE CHARACTERISTICS OF A PROPORTIONAL DIFFERENTIAL PRESSURE PRODUCING FLUID FLOW DEVICE

[76] Inventor: William R. Brown, 341 W. Mount Vernon St., Lansdale, Pa. 19446

[22] Filed: Mar. 5, 1974

[21] Appl. No.: 448,280

Related U.S. Application Data

[63] Continuation-in-part of Ser. No. 308,031, Nov. 20, 1972, abandoned.

[52] U.S. Cl. .......................................... 73/212; 73/3
[51] Int. Cl.² ...................... G01F 1/46; G01P 5/16
[58] Field of Search .................. 73/212, 213, 272, 3

[56] References Cited
UNITED STATES PATENTS

| | | | |
|---|---|---|---|
| 2,260,019 | 10/1941 | Gentile, Jr. | 73/212 |
| 2,605,639 | 8/1952 | Gentile, Jr. | 73/272 |
| 3,449,954 | 6/1969 | Brown | 73/212 |
| 3,590,637 | 7/1971 | Brown | 73/212 |
| 3,683,693 | 8/1972 | Brown | 73/212 |

OTHER PUBLICATIONS
Foster Engineering Bulletin 1953.

*Primary Examiner*—Herbert Goldstein
*Attorney, Agent, or Firm*—Benasutti and Preston

[57] ABSTRACT

In the conduit of a fluid or gas flow system at least one pressure sensing form extends inwardly from the wall of the conduit to produce a selected predetermined differential pressure output and the performance characteristics desired for a given rate of flow and application. The convergent angle, configuration, frontal area, orientation of the form or location of the pressure taps in the form is/are changed to selectively produce the desired overall performance of the flow device.

4 Claims, 12 Drawing Figures

METHOD OF SELECTIVELY VARYING THE DIFFERENTIAL OUTPUT AND OVERALL PERFORMANCE CHARACTERISTICS OF A PROPORTIONAL DIFFERENTIAL PRESSURE PRODUCING FLUID FLOW DEVICE

CROSS REFERENCE TO RELATED APPLICATION

This application is a continuation-in-part of my copending application Ser. No. 308,031, filed Nov. 20, 1972 (now abandoned), and incorporates by reference that application.

BACKGROUND OF THE INVENTION

This invention relates to fluid and gas flow measuring devices and, in particular, to devices which produce a differential pressure, in relation to the Beta ratio and flow rate to actuate secondary instrumentation of various types.

Prior art flow metering devices for use in the measurement of media referenced include completely annular flow and Venturi tubes and orifice plates as primary measuring devices known as "proportional" meters. These primary measuring devices restrict total flow producing relatively high head losses and numerous other undesirable characteristics as noted in my prior copending application. The so-termed "proportional" devices ostensibly measure only a portion of the total flow. However, the term as heretofore applied to fluid meters merely pertained to very small sizes of the basic meter installed in a small by-pass or shunt line and had no relation to the device described herein. These devices and piping arrangements have numerous shortcomings, as noted in prior art and in the A.S.M.E. publication entitled "Fluid Meters, Their Theory and Application," copyright 1959.

Prior art devices which are not annular constructions, such as pitot tubes and insert "rod" type devices are designed to sense pressures at specific points in the flow path, and are not capable of producing a varied selection of desired Beta ratio values and variable differential pressure outputs for a given flow rate. They are, therefore, not pertinent to the present invention. In the case of Venturis having streamlined, pitot-like, sensing forms mounted internally, it is necessary to change the diameter of the throat and/or main diameter of the conduit to effect a change in Beta ratio and differential produced. The pitot-like forms are not varied to change the Beta ratio and they are not intended for this purpose.

Other segmental type meters utilizing forms having profiles of Venturis and nozzles or trapezoidal type forms cannot produce the magnitude of differential, stability and the desired correlation of mean velocities both at the high and low pressure sensing taps, as my invention does. They also cannot sense both high and low pressure dynamically.

None of the prior art devices having generally triangular sensing forms provide a means for selectively varying and producing a predetermined effective Beta ratio and resultant differential pressure output by providing a predetermined restriction to fluid flow in the conduit in which the fluid was flowing. Further, there was no method in the prior art of changing the size, orientation and configuration of the non-annular pressure sensing form or forms in the meter and the location of the taps in the sensing forms to produce the desired predetermined effects.

SUMMARY OF THE INVENTION

My invention provides numerous methods for a manufacturer of segmental, proportional differential pressure producing fluid flow devices to select and vary the size, configuration and orientation of the non-annular pressure sensing forms and location of taps to obtain the overall performance he wishes to achieve for a given application. He can then select and determine the best means for accurately measuring a selected fraction of the total flow; which means can be inserted into the main flow path or conduit thereby eliminating the need for conduit branch or by-pass lines and shunts, and the small sizes of auxiliary meters of the completely annular constricted type such as Venturis, orifice plates and nozzles. The variable area, float type Rotameter-like devices can be connected directly to my invention.

In accordance with the present invention it is possible to select the form size, configuration and orientation, and pressure tap locations to produce the desired differential pressure output and functional characteristics for a given pipe size, flow rate, application and flow media. This device can handle flows in either direction. Therefore, this device is an extremely flexible and unique differential pressure producing device and, as described herein, provides significantly better performance characteristics than devices known in the prior art. Devices in accordance with the present invention will comprise at least one and preferably a plurality of pressure sensing forms disposed generally radially inwardly from the inner wall of a conduit in a fluid flow system; each of which forms has a transverse area representing a restriction or obstruction in the conduit. This transverse area, the exact configuration and orientation of the forms, pressure tap locations, and angle of convergence can be accurately determined empirically and then mathematically before insertion of the form or forms into the conduit, to produce very predictable, repeatable and accurate results as proved by tests. Devices produced in accordance with my invention provide numerous means for varying the differential pressure outputs and overall performance characteristics.

The procedures used to establish applicable mathematical expressions and values for my invention are identical, in most respects, to those used to establish the expressions and values for Venturis and flow tubes; as all of the variations of this invention conform in principle to the basic Bernouilli theorems relating to differential pressure producing flowmeters.

It is an interesting fact that numerous patented inventions which have been successfully produced and marketed for many years still have not been reduced to exacting mathematical expressions nor have the associated phenomena observed been theoretically explained to the satisfaction of the top experts in this general field of fluid dynamics, where unexpected paradoxes are the rule and disagreement between the experts on theoretical and mathematical explanations of phenomena observed is quite general.

In the case of the invention described herein, several 4 inch and 8 inch sizes of meters, in addition to one 12 inch and one 18 inch meter were tested at four highly reputable and independent laboratories. These models were tested, modified, varied, re-tested. The basic principles were conclusively proved and the related basic mathematical formulae, included in this specification, were thus established and are described hereinafter.

These formulae should definitely serve as a sufficient and sound basis for explaining the performance of the devices indicated as being the preferred embodiments and for predicting the results of most of the changes that can be made to these embodiments. As indicated later on, some additional testing of other modifications observed will have to be accomplished to establish constants applicable to the various degrees of these modifications. As noted, all of the modifications or variations described herein were observed.

During the course of these tests it was determined that numerous sizes, configurations and orientations of the pressure sensing forms and numerous pressure tap locations all produced excellent, qualitative and quantitative results, insofar as accuracy, extremely wide measuring ranges, extremely low head losses, linear coefficient values down to approximately 24,000 pipe Reynolds number, $N_R$, (lowest rate tested) and up to approximately 1,000,000 $N_R$, (highest rate tested) and repeatability are concerned. These tests proved that this meter could literally be selectively varied to achieve practically any result desired.

In connection with any additional tests that might be required it can be stated that a quotation from an independent laboratory indicates that my invention (in small quantity lots) can be individually calibrated, if necessary, for a cost less than one-tenth of that now charged for the calibration of other types of flowmeters referred to, regardless of whether just one or a small quantity of these units is involved.

The scope of the methods or means of selectively changing the component elements to produce the desired meter performance to suit the application and the customer's requirements are limited to these (means) believed to be necessary to cover most conditions encountered in the measurement of fluids and gases in the municipal and industrial flowmetering fields and are described as follows:

Tests of pressure sensing forms having a basically triangular configuration and oriented as shown in FIG. 4 conclusively proved that by varying angle A' (FIG. 4) and angle A'' (FIG. 5), the differential output of the meter is likewise varied. If these angles are increased the differential outputs are also increased and if these angles are decreased the differentials for a given flow rate are also decreased. The degree of change is directly related to the angular velocity component involved. When the differentials are increased, the coefficient values are decreased and when the differentials are decreased the coefficient values are increased. The general relationship of changes of these values corresponds to that applicable to conventional Venturis and flow tubes and is calculated accordingly. The exact maximum limit to which these angles can be increased is not known. However, tests included a form having a 60° angle and the meter performance was very satisfactory in all respects. However, it is indicated by tests of triangular forms oriented in this manner and installed in a cylindrical conduit-like section that there is a point of diminishing returns. By that it is meant that up to a certain point the ratio of increase of angle A to the increase of differential is quite substantial and the related increase in head loss, if expressed as a percentage of the differential, is relatively small. However, beyond this point, while the ratio of increase of angle A to increase in differential continues to be quite substantial, the increase in head loss, as a percentage of the differ-ential, becomes almost directly proportional to the increase in the differential. Therefore, if losses are being compared in terms of percentage of the differentials, it is not practicable to increase angle A beyond this point. However, it is now becoming more prevalent to express head loss in terms of "net" or "actual" loss as it had been for many years. The "net" loss being equal to the gross or combined head loss caused by the pipe and the flowmeter minus the head loss caused by the pipe or:

$$H(net) = H(gross) - H(pipe)$$

Insofar as my invention is concerned, the "net" head loss is practically immeasurable and when expressed as a percentage of the differential, is approximately 2 percent. Using either method, the loss is very negligible. Therefore, a range of from perhaps 10° to 75° for angle A would probably be feasible.

Further, tests of the sensing forms oriented as shown in FIG. 4 proved that the sloping surface 26 facing into the flow literally rectifies or "averages out" deviations in the velocity profile and the degree of averaging is related to the degree of this angle. As the angle is increased, the degree of averaging is increased and, as the angle is decreased the degree of averaging is decreased. The applicable quantitative and qualitative values would have to be determined empirically.

Further, tests prove that this orientation of the form is particularly advantageous when solids-entrained fluid media, included medium density sewage sludge, are being measured, as the forms are self-scouring and neither the vertical high pressure tap 15 (FIG. 4) in the sloping surface or the low pressure tap, 17 or 19 (FIG. 4) in the vertical surface 27 or in the wall of the conduit 11 will become plugged. However, if some very dense sludge or paper waste media are being measured, it is recommended that the vertical high pressure tap 15 be "rodded" occasionally and/or back-purged, if necessary, in the same manner currently used on Venturis and flow tubes. These same advantages are inherent in form 30, FIG. 5, and the pressure taps 32 and 34 can also be easily rodded and/or back-purged, if necessary. Tests prove that the low pressure taps 17 and 19 (FIG. 4) are encapsulated in a body wake developed by flow curvatures formed over and around them and will not plug even if dense sewage sludge is being measured. Tests of wedges oriented as illustrated in FIG. 4 in a conduit bearing this very concentrated fluid showed that after several months installation the sloping surface 26 (FIG. 4) was literally slightly burnished and the vertical surface 27 (FIG. 4) was absolutely free of any residual matter whatever and, in fact, appeared exactly as it had been prior to installation. Further, there was no residual in or plugging of pressure taps whatever.

As indicated in my U.S. Pat. No. 3,590,637, I can change the width (referred to as "Length or aspect ratio," in this document) and/or height (frontal area) of the pressure sensing forms and, thereby increase or decrease the differential output of my invention. It is also possible to change the location of the pressure taps in the forms or the orientation of the forms or the orientation of the meter or the angle of the leading surface and, thereby, increase or decrease the differential output. Any one or almost any combination of these factors can be changed to increase or decrease the differential output of my invention and, regardless of which one or combination of these factors is used, the ones tested or observed produced excellent qualitative results, insofar as linearity of coefficient and accuracy or scatter of test points over extremely wide measuring ranges under varying conditions of flow, predictability and repeatability are concerned and this fact is confirmed by the figures included in this specification. Another fact proved by these figures, and I refer particularly to FIGS. 8 and 10 through 12 inclusive, and tables 1 and 2, is that the quantitative results, such as differential outputs versus flow rates, are excellent and indicate that the differentials produced are of sufficient magnitude to very satisfactorily actuate current and readily available, commercial type differential pressure converter transducers or transmitters (secondary instrumentation) now used in conjunction with all other types of differential pressure producing primary devices, such as conventional and modified Venturis, flow tubes, orifice plates, insert rod-type meters, etc., over all normally encountered flow ranges. Further, as indicated hereinbefore, these differentials (for given flow rates) can quite simply be increased or decreased by the numerous means described to suit almost any specific requirement of a customer or application.

Table 1 shows comparative performance data of a group of sizes of flow tubes by one manufacturer:

Table 1

| D | d | FLOW TUBE CAPACITIES Flow Ranges (MGD) | | | |
|---|---|---|---|---|---|
| 6" | 2.529 | .300 | .400 | .500 | .800 |
|  | 3.114 | .450 | .600 | .750 | 1.200 |
|  | 4.000 | .750 | 1.000 | 1.250 | 2.000 |
|  | 4.428 | .9375 | 1.250 | 1.5625 | 2.500 |
| 8" | 3.466 | .562 | .750 | .937 | 1.500 |
|  | 4.018 | .750 | 1.000 | 1.250 | 2.000 |
|  | 4.919 | 1.125 | 1.500 | 1.875 | 3.000 |
|  | 5.978 | 1.725 | 2.300 | 2.875 | 4.600 |
| 10" | 3.991 | .750 | 1.000 | 1.250 | 2.000 |
|  | 4.919 | 1.125 | 1.500 | 1.875 | 3.000 |
|  | 6.343 | 1.875 | 2.500 | 3.125 | 5.000 |
|  | 6.907 | 2.250 | 3.000 | 3.750 | 6.000 |
|  | 7.710 | 2.906 | 3.875 | 4.844 | 7.750 |

Table 2 shows comparative performance data for another group of sizes of flow tubes produced by one manufacturer:

Table 2

| D | d | FLOW TUBE CAPACITIES Flow Ranges (MGD) | | | |
|---|---|---|---|---|---|
| 3 | 1.126 | .060 | .080 | .100 | .160 |
|  | 1.265 | .075 | .100 | .125 | .200 |
|  | 1.609 | .120 | .160 | .200 | .320 |
|  | 1.798 | .150 | .200 | .250 | .400 |
|  | 2.171 | .225 | .300 | .375 | .600 |
|  | 2.434 | .300 | .400 | .500 | .800 |
| 4 | 1.792 | .150 | .200 | .250 | .400 |
|  | 2.203 | .225 | .300 | .375 | .600 |
|  | 2.814 | .375 | .500 | .625 | 1.000 |
| 6 | 2.529 | .300 | .400 | .500 | .800 |
|  | 3.114 | .450 | .600 | .750 | 1.200 |
|  | 4.000 | .750 | 1.000 | 1.250 | 2.000 |
|  | 4.428 | .9375 | 1.250 | 1.5625 | 2.500 |

The following are descriptions of various embodiments of my invention and their performances. The performances are graphically illustrated in the figures incorporated in this application. Tests were conducted by four different laboratories. In one laboratory, two different test loops were used for testing of different sizes of meters. Two of the four laboratories used similar "gravity" type flow loops and the other two laboratories somewhat similar "dynamic" (pumped flows) type flow loops. Most test procedures and equipment were quite similar. However, anyone skilled in the art realizes that there are qualitative and quantitive differences inherent in different loops and, in fact, there are differences in readings, which affect both of these very major factors when several individuals test the identical flowmeter in the identical loop under identical flow conditions. In view of this situation, it is somewhat unusual that the consistency of patterns of ratios and relationships of common and related factors and their corresponding numerical values are as accurate as described. Differences of from 1 to 5 percent, depending on the factors involved, under these conditions, certainly would not be considered as being unusual, and may, in fact, explain some of the few inconsistencies noted herein. The minimum differentials shown in FIGS. 10, 11 and 12 can be increased as required.

Two basic types of meters comprised of several of the different types of forms delineated in the figures incorporated in this specification and produced in accordance with my invention and the changes made to these meters and the resultant changes in their performance are described in detail hereinafter and delineated in the figures. Other changes effected and the resultant changes observed are more briefly described and are not delineated on figures.

The meters designated as Type "A" had eight triangular forms 37 (FIGS. 6 and 7) installed in the inside diameter of the conduit 11. Four of these forms were oriented as illustrated in FIG. 6 and four of these forms 37 were oriented as illustrated in FIG. 7. They were spaced equally from a circumferential standpoint. The orientation was alternated. The first form installed was oriented as shown in FIG. 7, the second form was oriented as shown in FIG. 6, the third form as shown in FIG. 7, etc. All forms were installed in the same axial band or plane. (They were not staggered.)

The meters designated as Type "B" had either four or eight forms 12 and all of these forms were installed in the conduit 11 exactly as shown in FIG. 2. They were all installed in the same axial band or plane. (They were not staggered.)

As shown in FIG. 8, one 12 inch size type "A" meter having a total frontal area of forms slightly less than 4 percent, produced a coefficient value of approximately 0.861. An inside or internal diameter of 11.938 inch and an equivalent area of 112 square inches were used as the base data for the unobstructed pipe. Using the formulae and procedures described hereinafter and the test data, it was quite simple to calculate the frontal area (sq. in.) of the forms, 8 (⅜ × 1½) = approx. 4.5 square inches and that 4.5 square inches was the equivalent of 4 percent of 112 square inches. Subtracting the 4.5 square inches from 112 square inches, the result was 107.5 square inches. Then converting 107.5 square inches to an equivalent diameter by using formula $$D = \sqrt{\frac{A(\text{sq. in.})}{0.7854}}$$

the result was 11.703 inches diameter. This diameter is referred to as the "effective throat diameter" or $A_t$ or $d$. To determine the "effective Beta ratio," we simply divide $d$ (11.703) by $D$ (11.938) and the result is 0.980. If we consider the unobstructed pipe as having a Beta of unity or 1, the decrease in Beta is approximately 2 percent and this corresponds to the percent of decrease between the pipe diameter (11.938) and the effective throat diameter (11.703) which is also approximately 2 percent. Apparently there is also a ratio of 2 to 1 between the percentage of change in frontal areas (0 to 4 percent) and the percentage of change in the effective Beta ratios and the effective throat diameters. All other factors such as head loss, differentials, water temperature, time, water weight, flow rate, etc., can be measured with or read directly from the test equipment and/or computed, using conventional formulae and procedures. The determination of the proper coefficient of discharge ($C$ or $C_D$ or $K$) which is a dimensionless factor, appears quite simple and is stated as a ratio:

$$C = \frac{\text{Actual weight rate of flow}}{\text{Theoretical weight rate of flow}}$$

However, it is not as simple as the formula implies. The somewhat unorthodox loop used for testing of the 12 and 18 inch size ring meters was also used to test Venturis and flow tubes and the characteristics, when testing the latter, indicated that it produced coefficient values approximately 2½ percent lower than calculated and 2½ percent lower than produced by other laboratories. This difference was also observed in the tests of the 12 and 18 inch sizes of ring meters. The loops used to test the 4 and 8 inch sizes were more conventional and the calculated values coincided very closely with the actual values.

Further, another 12 inch size, type "A" meter, identical to the one hereinbefore described, with one basic exception, having a 6 percent total frontal area of forms or a 50 percent increase in frontal area, produced approximately 20 percent greater differential than the meter having 4 percent frontal area. In this case, the "widths" of the forms were increased by 50 percent (from three-eights to nine-sixteenths) but, the height of 1½ inch was not changed. This increased the frontal area from 4.5 square inches to 6.75 square inches (equivalent to a change from 4 to 6 percent).

The results were: an approximate increase of 20 percent in the differential value (for a given flow rate); a decrease in the value of the effective Beta ratio from 0.980 to 0.969 (approx. 1 percent difference); and a decrease in the effective throat diameters from 11.703 inches to 11.577 inches or an approximate decrease also of 1 percent. Here again, the percentages of change between the effective Beta ratios and effective throat diameters were equal. The 2 to 1 ratio between the percentage of change in the frontal areas used (4 to 6 percent or a difference of 2 percent) and the percentage of changes in effective Beta ratios and effective throat diameters is still indicated. The coefficient value calculated was 0.811 versus an actual value of 0.791. Here again the approximate difference of 2½ percent, attributed to the loop characteristics, was evident as hereinbefore described. In other words, the coefficient produced was approximately 2½ percent lower than it should have been.

While the type "B" meter embodiment basically produces 23 percent greater differential for identical Beta ratios and flow rates than the type "A" meter, as shown in FIG. 10, the ratios and relationships of factors described hereinbefore are common to both types and the formulae described hereinafter are also applicable to all embodiments of my invention.

Further, additional confirmation of these ratios and relationships were observed when the frontal area of the forms in the 8 inch size type "B" meter shown in FIG. 9 and Table 1 was increased from 3 inches to 3.24 inches by increasing the "height" only of the forms. This dimension (height) was increased from 1.00 inch to 1.080 inch on all eight forms, identical to form 12, FIG. 2. All forms were three-eights inch wide and oriented as shown in FIG. 2. This meter embodiment is designated as type "B." As noted, only the height of these forms was increased (by 0.080 inch) which represented an increase of the total frontal area of the forms from 3 inches to 3.24 inches or the equivalent of from 6 to 6.48 percent or an increase of 8 percent. This change, in turn, decreased the coefficient value from 0.7315 to 0.720 resulting in a 3.2 percent increase in differential output as calculated:

$$\left(\frac{0.7315}{0.720}\right)^2 = 1.015972^2 = 1.0321 \text{ or } 3.2\%$$

(Original frontal area = 8 (⅜ × 1) = 3.0 sq. in.)
(Revised frontal area = 8 (⅜ × 1.080) = 3.24 sq. in.)

and the effective Beta ratio was decreased from approximately 0.969 to 0.9666 (or approximately three-tenths of 1 percent). The effective throat diameter or $d$ was reduced from approximately 7.736, for 6 percent, to approximately 7.715 diameter for 6.48 percent (or approximately three-tenths of 1 percent). The pipe diameter, or $D$ was 7.981, or approximately 50 square inches area. These changes were as predicted and are illustrated in FIG. 9.

Therefore, if we consider the internal area of the pipe or ring as $A_p$ or $D$ and the "effective throat area" as $A_t$ or $d$, we have a very definite correlation between $d/D$ and we designate this ratio as the "effective Beta ratio." $A_p$ or $D$ minus the frontal area of the forms ($A_f$) equals the effective throat area or $A_t$ or $d$. $A_f$ equals, for example; 4 forms (⅜ × 1) = Sq. in. form area. ($A$ in.$^2$/144 = Sq. ft. area.) Areas, of course, are converted to corresponding diameters using the conventional formula, $$D = \sqrt{\frac{A \text{ (Sq. in.)}}{0.7854}}.$$

In other words, I have designated the ratio of areas as the "effective Beta ratio" and, as the forms are segmental (not completely annular), I have designated their total area as "frontal" area ($A_f$). When the area of the pipe is converted to a diameter (inches) it is designated $D$ (equivalent to $A_p$). When $A_f$ is subtracted from $A_p$ and the result converted to a diameter (inches), it then is designated as the "effective throat diameter" $d$ (equivalent to $A_t$). The ratio of $A_p$ to $A_t$ × ratio of $d/D =$ the "effective Beta ratio." The uniqueness of my invention necessitated the "coining" of new terms and symbols for the purposes of clarity and for differentiation between those terms and symbols used in the description and calculations pertinent to the completely annular constricted type of differential pressure producing flowmeters. However, as stressed previously hereinbefore, the mathematical relationships of basic corresponding factors for my invention and the constricted type meters are, for all practical purposes, the same. Naturally, different constants apply to different configurations producing different quantitative and qualitative results, as is the case with most differential pressure flowmeters in the art. However, the basic relationships of common factors remain unchanged.

The term "effective Beta ratio" as used herein correlates generally to the accepted definition of Beta ratio as that term is used in constricted fluid flow differential pressure producing devices having completely annular constrictions or throat sections such as, orifice plates, flow nozzles, Venturis and flow tubes, etc. The mathematical value of the effective Beta ratio as defined and expressed herein is used in the determination of coefficient values, differentials and flow rates in a similar manner and with similar equations as now applied to the term Beta ratio when used with reference to the aforementioned devices. As described hereinbefore, this "effective" ratio can be expressed in terms of diameters, where $d$ represents the effective throat diameter and $D$ represents the diameter of the conduit.

$$\text{"Effective Beta ratio"} = \frac{d}{D} = \frac{\text{effective throat area}}{\text{area of conduit}} \frac{(A_t)}{(A_p)}$$

where:

$A_p$ = Area of Pipe I.D. (sq. ft.) = $D$ $A_f$ = Total frontal area of forms (sq. ft.) e.g. 4 (forms) × ¾ wide × 1 inch high) = 4 (¾ × 1) = in.² and in.²/144 = Ft.²

$A_t$ = Effective Throat Area (sq. ft.) = $A_p - A_f = d$

Also, as noted hereinbefore, areas can simply be converted to corresponding diameters by converting the areas (sq. ft.) to areas (sq. in.) and then determining the diameters by using the well known formula, $$D = \sqrt{\frac{A \text{ (sq. in.)}}{0.7854}}.$$

Conversely, diameters can be converted to areas by using the well known formula, $A = 0.7854 \times D^2$.

If I changed the orientation of the identical forms 180° within the inside diameter of the ring or conduit, I thereby change its function. For example, when form 37, FIG. 7 is oriented with its vertical surface 35 facing upstream, single tap 36 senses the high pressure. When its vertical surface 35 faces downstream, as shown in FIG. 6, single tap 36 senses the low or negative pressure. In both cases, the pressures sensed are very stable. Further, tests conclusively proved that by alternating the orientation of the same forms 37 within the inside diameter of the ring or conduit, that is, by using at least one form 37 oriented as shown in FIG. 6 and at least one form 37 re-oriented 180° to flow as shown in FIG. 7, a very satisfactory differential pressure was produced over a very wide flow range and this type of configuration constituted a very practical and an extremely accurate flowmeter. The performance of this meter, designated as type "A," is shown on FIG. 10. Its coefficient value is 0.811 and this meter can measure flows in either direction with a change in signal, but with no change in coefficient value.

Further, test conclusively proved that when all of the forms 12, FIG. 2, having the identical size and frontal area as form 37, (meter designated as type "B") are oriented as shown in FIG. 2 with normal flow direction, the differential output for a given flow rate was 23 percent higher than that produced by the forms 37 installed in the alternating orientation referred to hereinbefore (meter type "A") as clearly shown in FIG. 10, which indicates a coefficient value of 0.731 and a very high degree of accuracy and linearity. It follows that a 23 percent increase in differential also results in a 23 percent reduction in head loss. This identical meter, (type "B") when measuring "Reversed Flow," produces approximately 30 percent lower differential than when oriented as shown in FIG. 2 for measuring flow in "normal" direction. However, angle A and height $h$ can be increased to likewise increase the differential to match the output of the former type orientation referred to. Summarizing, it can be stated that when a meter having all forms as 12 oriented as shown in FIG. 2, measures flow in normal direction, it produces approximately 30 percent greater than when the identical meter having identical forms measures flow in the reversed flow direction. However, if angle A of form 12, FIG. 2 is increased and the height of the vertical surface 14 is also increased to suit the larger angle (maintaining dimension $X$ for both taps 16 and 18) the differential output can be increased to match that of the meter having all forms, as 12, in FIG. 2. The latter modifications referred to should then be capable of producing the same differential for a given flow rate, regardless of the direction of flow. These same results can also be obtained by increasing the angle A and the height $h$ to a lesser degree and, in addition, increasing the width $w$. The latter method (increasing $h$ and angle A to a lesser degree and also increasing $w$) is preferred as it is desirable to maintain as low a value of $h$ as possible to prevent any excessive protrusion of the form into the main body of flow.

Further it is possible to change angle A (FIG. 2) in reversed flow or angle A' (FIG. 4) in normal flow or angle A'' (FIG. 5) in normal and reversed flow, but maintaining height $h$ as shown in FIGS. 4 and 5, thereby also maintaining the same frontal area (height × width) of the form and maintaining the same effective Beta ratio in order to vary the differential output. Again, as these angles are increased the differentials are also increased. If these angles are reduced, the differentials are reduced. However, as noted, by maintaining the height and width of the form the "frontal" area is not changed, therefore, the effective Beta ratio also is not changed. These results were observed as stated. However, mathematical expressions have not been developed to date to ensure accurate predictability. Until these expressions are formulated, results must be obtained empirically.

In addition to the universality or versatility of my invention as described hereinabove, it has numerous advantages over the conventional and modified Venturis and flow tubes having convergent upstream sections, completely annular constricted throat sections and recovery sections. It also has numerous advantages over orifice plates and the inserted rod and pitot flowmeter devices. The latter units (rod and pitot) are relatively inaccurate, unstable, have very limited measuring ranges and are, therefore, used primarily for "control" purposes in the "HVAC" field rather than for accurate measurement purposes where billing and accurate feeding or blending of chemicals, etc. in proportion to rate of flow are involved.

Most of these advantages are described in my current U.S. Pat. Nos. 3,590,637 and 3,683,693. However, additional advantages are as follows. My invention does not have an upstream convergent section or a completely annular throat section. Therefore, it is not subject to the incidence of "cavitation," which is inherent to some degree in all known Venturis, flow tubes and nozzles, particularly, when large fluid flows (high velocities and differentials) are being measured and the negative pressures at the throat varies between 3.1 feet, for Herschel-type Venturis and 9.2 feet (feet of water above absolute 0 pressure) for flow tubes and nozzles. Cavitation occurs when the velocity at some point reaches a value that is sufficiently high to cause the pressure to approach absolute zero which constitutes a perfect vacuum and vapor filled cavities are formed within the fluid being measured. Cavitation, therefore, occurs in Venturis, flow tubes and nozzles when the throat pressure is equal to the vapor pressure and causes extreme reductions in efficiency and considerable alteration in the nature of the flow. It also causes extreme degrees of corrosion or pitting of metals wetted by the fluid flow and can actually destroy metal. Therefore, as pointed out, the fact that my invention is not affected by this phenomemon within any known or anticipated flow range is an extremely important advantage and a highly unique feature.

Another very important and distinct advantage of my invention over the devices referred to is that it has no completely annular throat constriction. Therefore, its head loss is almost negligible and this fact eliminates the need for a recovery section. In other words, there is relatively no pressure drop introduced into my invention and, therefore, there is no appreciable loss to be recovered. Further, if the included angle of a recovery section is not exactly correct for each size and Beta of each Venturi and flow tube, the flow within this section is very unstable, first following one wall and then the other. This results in variations in pressure in this section which is reflected back to the throat measuring section. This produces variations of the differential pressure and unstable fluctuations of the differential water columns which, in turn, causes the secondary instrumentation, actuated by the differential pressures, to also be unstable. It is, or course, not feasible for a manufacturer of flow tubes and Venturis to vary the included angle of each recovery section to suit every size and Beta of the extremely wide range of products they produce. Therefore, they must either use a compromise value for this angle which should be compatible for the greatest number of variations or utilize a very small included angle which increases the lengths of their products considerably or a very large angle which produces a complete separation at the end of the throat and the high velocity jet travels through the center of the recovery section. Usually, they utilize the compromise value, which does not exactly suit all sizes and Betas of their products and they accept the unstable characteristic observed in the differentials and rely on the secondary instrumentation to have the capability for "damping out" these fluctuations. Of course, some degree of sensitivity, response time and accuracy is usually sacrificed when this method is used to control the unstable characteristics of the primary devices.

An additional unique and highly advantageous feature of my invention over the Venturis, flow tubes, nozzles, orifice plates and other fluid and gas measuring devices is its capability to satisfactorily handle and accurately measure flow rates closely comparable to that of an unobstructed pipe as clearly proved by the Tables and coefficient curves shown in FIGS. 11 and 12. For example, as shown in Table 1 and FIG. 11, one 8 inch size ring meter, conforming to the specifications of my invention, can satisfactorily measure the flow rates currently being measured by at least nine (and probably 11 or 12) different sizes of 6 inch, 8 inch and 10 inch flow tubes produced by a manufacturer of these devices. Table 2 and FIG. 12 indicate that one 4 inch size ring meter can satisfactorily measure the flow rates currently being measured by at least eleven different sizes of 3 inch, 4 inch and 6 inch flow tubes produced by the same manufacturer.

Further, it is theorized that the typical converging or upstream sections of flow tubes, Venturis and nozzles might have a tendency to not only perpetuate, but, to accelerate and actually increase the power or effects of swirls and vortices which start or end on the wall or on the boundaries of the fluid, and that these effects, which are known to be highly disastrous to almost every conventional device referred to, would be magnified and be reflected back to the measurement area and accurate and stable measurements would be utterly impossible under these conditions. These sections also, in my opinion, do not, in most cases, change the effects of viscous or laminar boundary layer conditions which contribute greatly to flow separation and non-linearity, particularly at low Reynolds number.

Whereas, it is theorized that the blunt sensing forms in my invention practically eliminate the effects of laminar boundary layers and viscosity in the localized areas of measurement. I believe the extremely flat or linear coefficient curves extending down to very low Reynolds prove these points. Further, it is my opinion that the vane-like forms extending through the boundary and into the flow might have some beneficial effects where swirls and other non-standard deviations of flow are encountered.

As stated hereinbefore, several basic mathematical expressions have been formulated to help predict the performance of my invention. While these formulae have been applied successfully to several sizes and variations of my invention as proved by tests, it is to be stressed that additional data must be obtained by empirical procedures to (a) confirm that these expressions apply absolutely to all sizes and (b) to implement the predictability of the results of all of the numerous changes which have been and can be made to this device.

Conventional Venturi devices utilize the well-known and long-used standard equation for determination of discharge:

$$Q = C_d A \sqrt{2gh} \sqrt{1/(1-B^{-4})}$$

Where:

$Q$ = Discharge in CFS $A$ = Pipe area in square feet
$h$ = Meter differential in feet of water
$B$ = Diameter ratio of constricted throat diameter to main diameter As noted herein, my invention is not a conventional Venturi device having a completely annular throat constriction. Therefore, the standard equation, while it is extremely similar to those used in determining the value of Q for the numerous variations of my invention, does not necessarily apply. The basic reason for this is that the values and methods of determining the B or Beta ratio and the coefficient is somewhat different.

For devices conforming to the descriptions included herein, where the frontal area of the forms did not exceed approximately 6 percent of the total area of the pipe, the Beta ratio, B initially was considered as being equal to unity. Thus, the standard equation for determination of $C_d$ could be considerably simplified as stated:

$$Q = C_d' \, A \, \sqrt{2gh}$$

Tests proved the applicability of this equation within the frontal area parameter indicated and provided a very good degree of accuracy. When geometric and dynamic similarity are maintained and the frontal areas of the forms are identical, the coefficient values of all sizes of a given embodiment of my device should be constant. The coefficient value being the ratio of the actual rate of flow to the calculated theoretical rate of flow.

Conventional procedures for determining the discharge coefficient of my devices are used to determine the actual weight rate of flow or volume rate and the theoretical rate of my devices. The basic formulae used are stated hereinafter. The simplified equation was and can be satisfactorily applied to all embodiments of my device even beyond the frontal area parameter stated. However, further test indicate that is is probably more practicable and more applicable to utilize the following equations, symbols, considerations and procedures to achieve a somewhat higher degree of accuracy in the mathematical prediction of performance and particularly to cover the numerous variations of embodiments. The necessity for these trial procedures was that my device is highly unique and none of the numerous embodiments thereof conform to the configuration of any of the related prior art devices and no pertinent data are available. The basic data should be obtained empirically from tests of a given embodiment. Several changes should then be made to the forms as described hereinbefore and the tests should be repeated. These data are then correlated and pertinent factors can then be substituted in the following equations. These data can then be accurately extrapolated for the prediction of performance of any size (basic main diameter) and form configuration and dimension of this embodiment. Individual calibration from this point on is not required. Further, while numerous embodiments are delineated herein and all of these embodiments have been observed to function as described, it is believed that, from a practical standpoint, the embodiments shown in FIGs. 2, 4, 5, 6 and 7 and described hereinbefore should satisfy the present and anticipated requirements for all applications encountered in the flow metering field.

Where only the height and/or width (frontal area) of a given embodiment is/are changed, the following formulae for determination of coefficient, head loss and discharge apparently are quite accurate in predicting performance. Although, as emphasized, the initial base data for each embodiment used for determining the predictability of these devices and for extrapolation purposes should be obtained empirically.

Coefficient $$K = \frac{Q}{A_t \sqrt{2gh}}$$

Where:
$K$ = Meter coefficient-dimensionless
$Q$ = Flow rate in cubic feet per second
$*A_t$ = Throat area in square feet
$g$ = Local acceleration of gravity = 32.163 feet per second squared
$h$ = pressure differential in feet of water at run temperature $*A_t$ (or $d$) = $A_p$ (pipe area) minus $A_f$ (frontal area of forms). Frontal area of forms = (form width × height) times number of forms expressed in square feet.

Flow Rate — $Q_{cfs}$ (Used in Actual Test Procedure)

$$Q = \frac{W}{T\gamma}$$

$Q$ = Flow rate in cubic feet per second
$W$ = weight of water accumulated during run in pounds
$T$ = duration of run in seconds
$\gamma$ = specific weight of water at run temperature in pounds per cubic foot

DISCHARGE $$Q = KA_t \sqrt{2g\Delta h}$$

Where:
$Q$ = Flow rate in cubic feet per second
$K$ = Meter coefficient-dimensionless
$A_t$ = Throat area Number of forms $x \, (h \times w)$ $^{in.2}/144$ = Ft$^2$
$g$ = local acceleration of gravity = 32.163 feet per second squared
$\Delta h$ = pressure differential in feet of water at run temperature HEAD LOSS
$H_{net}$ =
$H_{net} = H_{gross} - H_{pipe}$
$H_{net}$ = net unrecovered head loss of the flow element
$H_{gross}$ = combined head loss due to the element and pipe
$H_{pipe}$ = head loss due to pipe Accordingly, it is an object of this invention to provide methods of selectively varying the performance characteristics of a proportional differential pressure producing device by determining the parameters of at least one non-annular obstruction in the conduit through which the fluid is passing.

It is a further object to produce a device by the method of my invention, which has an extremely low head loss, a greatly increased flow measuring capacity for a given pipe size and flow rate and will accurately measure an exact portion of the main body of fluid flow and provide accurate differential pressures and linear coefficients over an extremely wide range of flow rates.

These and other objects of this invention will become apparent from the following description with reference to the accompanying drawings.

DESCRIPTION OF THE PREFERRED EMBODIMENTS

Figure 1:
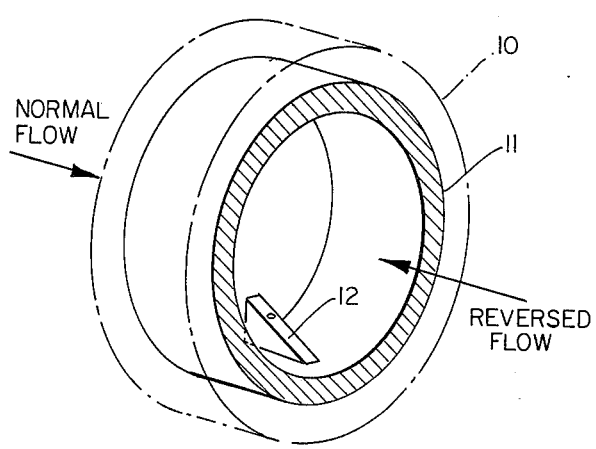
FIG. 1 is a perspective view of a device in accordance with one embodiment of my invention.

Although specific forms of the invention have been selected for illustration in the drawings, and the following description is drawn in specific terms for the purpose of describing these forms of the invention, this description is not intended to limit the scope of the invention which is defined in the appended claims.

Referring to the figures, in FIG. 1 an outer, relatively thick cylindrical ring section 10 for mounting between flanges on the customer's pipe, is illustrated in phantom lines. Within the ring is a relatively thin cylindrical section of conduit or a bushing 11. Together they show the basic environment in which the forms made in accordance with my invention are disposed. The inner conduit 11 has a generally uniform unobstructed inner surface which is preferably cylindrical. Fluid can be made to flow therein and can be measured in either direction of flow as shown by the arrows. One or more of the various forms are disposed in the conduit or inner ring 11, as for example, the form 12.

It is necessary to manufacture the forms accurately. Their corners and edges should be sharp and free from burrs and their sides should be parallel. This accuracy is necessary to be able to ensure the functional characteristics desired for a given device. Various types of forms and their methods of disposition in the conduits and rings have been described in my prior copending application and that description is incorporated herein by reference.

Figure 2:
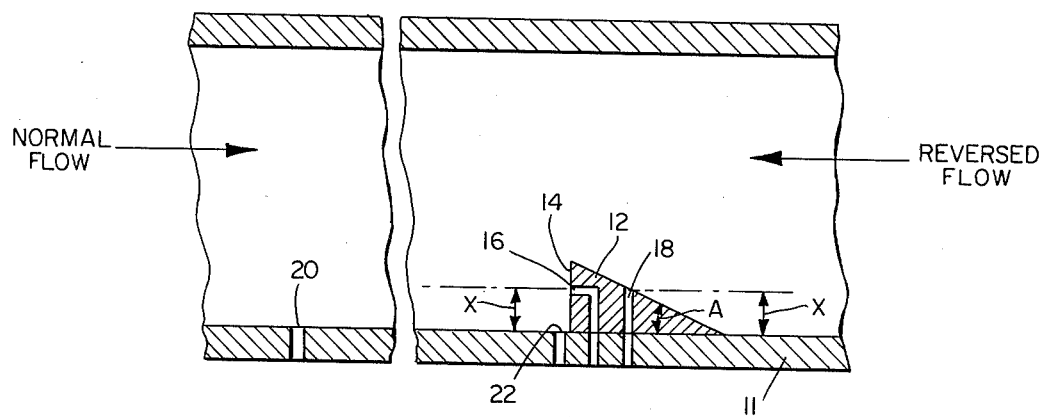
FIG. 2 is a vertical central section taken through the device shown in FIG. 1.

The form in accordance with the present invention can have one or more sensing taps therein communicating with passages through the wall of the conduit. For example, as shown in FIG. 2, a plurality of taps are provided in a single form. The form is blunt in that it has vertical upstream surface extending from the inner wall of the conduit towards the center, preferably perpendicularly, so that it is impinged upon by the fluid flowing through the conduit. The form has a generally triangular profile and the base of the form extends axially down the conduit along the wall therof. The hypotenuse, inwardly extending leg, and triangular sides are planar and those along the hypotenuse and inwardly extending leg are substantially rectangular.

A high pressure sensing tap 16 is disposed in the vertical face 14 of the form most preferably at the standard distance X (0.2 times the radius of the conduit) from the inner wall of the conduit; which distance represents the theoretical point of mean velocity. This tap 16 senses the velocity head plus the static pressure.

Figure 4:
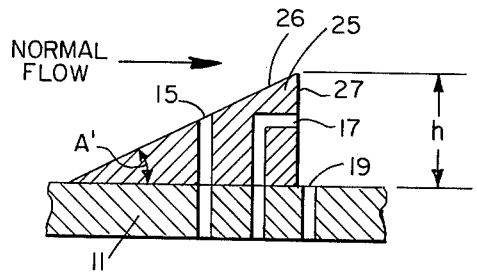
FIG. 4 is an elevational view of a form similar to the form shown in the prior figures illustrating a device in accordance with an embodiment of my invention.
Figure 6:
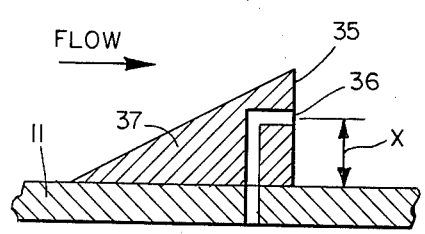
FIG. 6 is an elevational view of a form similar to the form shown in FIG. 4 illustrating an embodiment in accordance with my invention.
Figure 7:
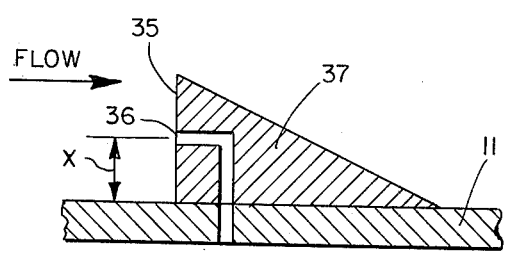
FIG. 7 is an elevational view of a form similar to the form shown in FIG. 6 illustrating an embodiment in accordance with my invention.
Figure 8:
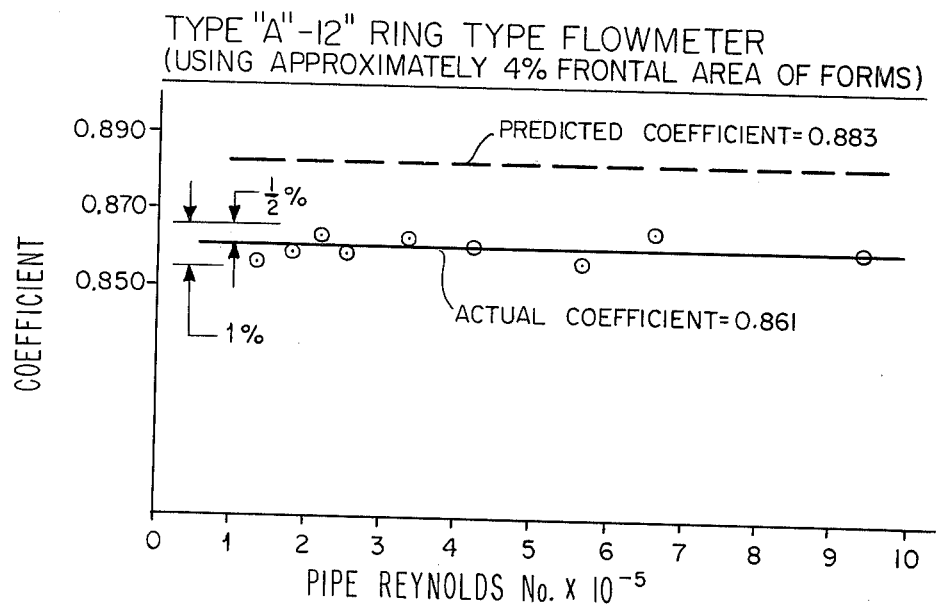
FIG. 8 is a curve showing the coefficient plotted against the pipe Reynolds number $N_r$ for one of the embodiments of my invention using only 4 percent frontal area of forms versus the curve showing the coefficient plotted against the pipe Reynolds number $N_r$ for the same general embodiment of my invention using 6 percent frontal area of forms.
Figure 9:
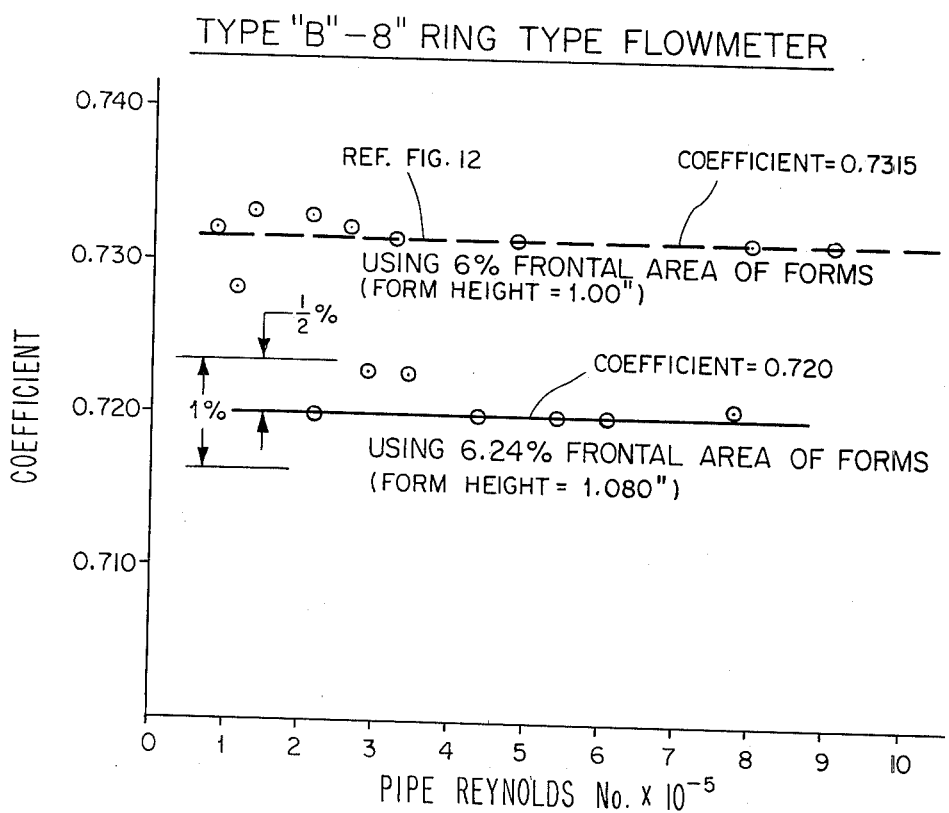
FIG. 9 is a curve showing the coefficient plotted against the pipe Reynolds number for one of the embodiments produced in accordance with my invention having a 6 percent frontal area of forms versus the coefficient of the same embodiment of my invention having a 6.24 percent frontal area of forms.
Figure 10:
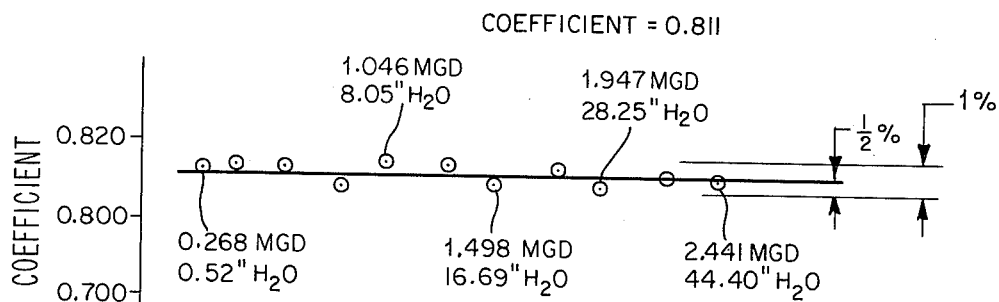
FIG. 10 is a curve showing the coefficient plotted against the pipe Reynolds number $N_r$ for one of the embodiments of my invention versus the curve showing the coefficient plotted against the pipe Reynolds number for another embodiment of my invention.
Figure 10:
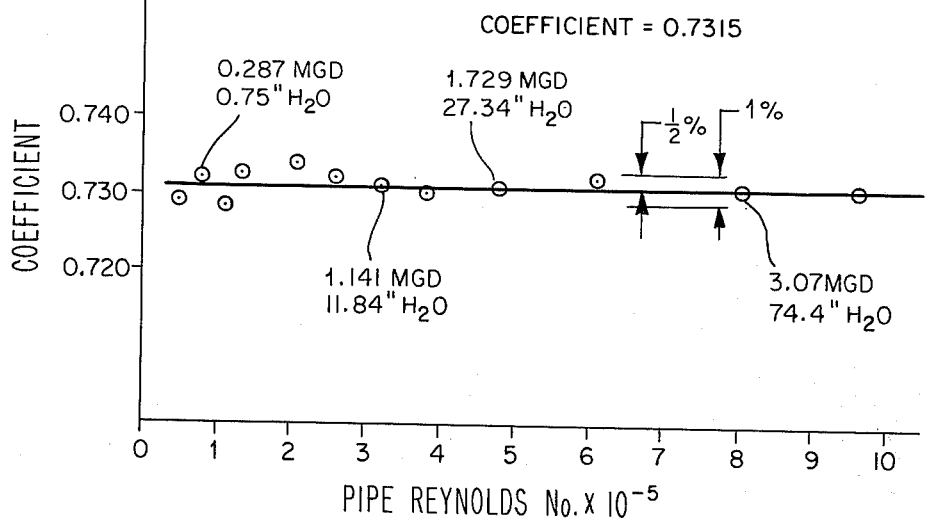
Figure 11:
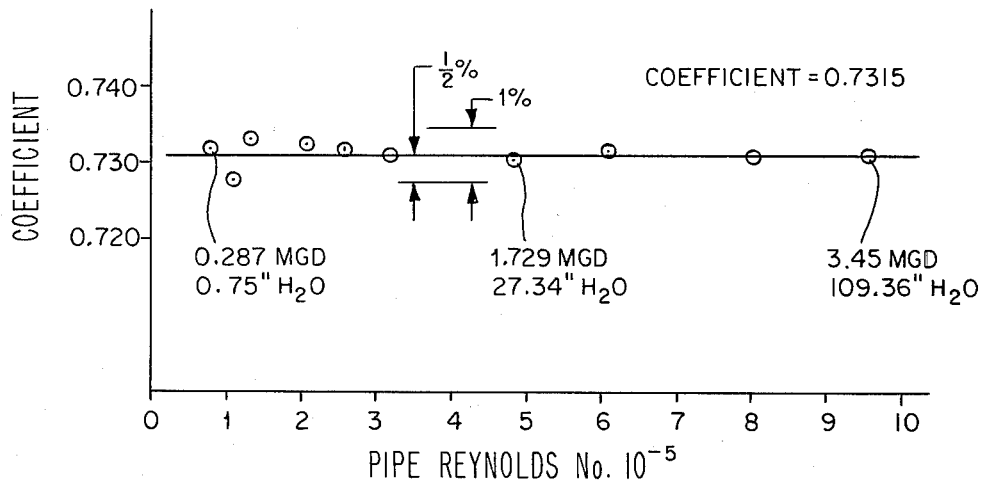
FIG. 11 is a curve showing the coefficient C plotted against the pipe Reynolds number $N_r$ for one of the embodiments of my invention.
Figure 12:
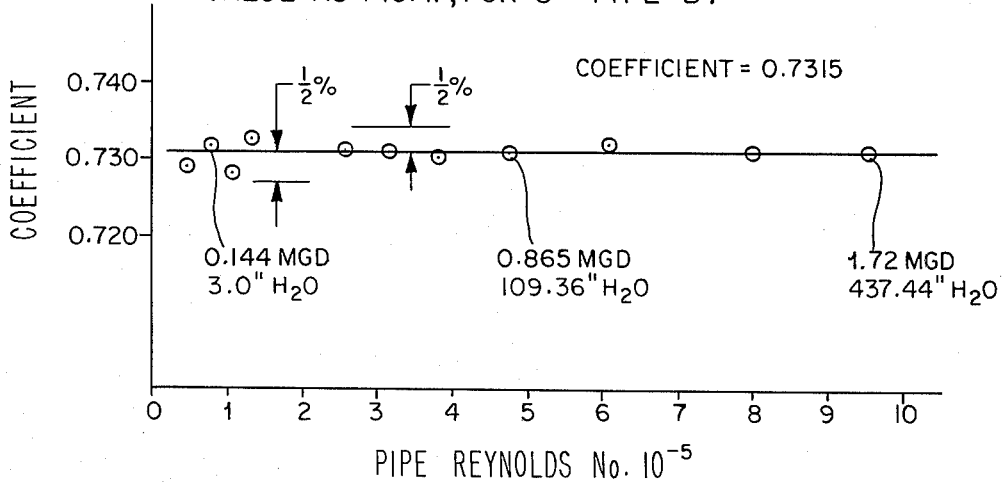
FIG. 12 is a curve showing the coefficient C plotted against the pipe Reynolds number $N_r$ for one of the embodiments of my invention.

A low pressure tap 18 is located in the sloping hypotenuse surface preferably at approximately the same standard distance X as the high pressure tap. The result is a correspondingly lower suction pressure and a much higher resultant differential pressure than is produced by taps in the wall of a cylindrical section (such as a pipe or in the wall of the throat of a Venturi), as shown by tap 19, FIG. 4, and even if the pressure is sensed by such taps 17 and 36 downstream and in the wake of a form as shown in FIGS. 4 and 6 respectively where the taps are located in the wall and the vertical surface is facing downstream. This also applies to low pressure taps in segmental forms, low pressure taps opening in curved profiles, and low pressure taps opening in relatively flat surfaces of forms which are parallel to the horizontal axis of the main flow.

The high and low pressure taps do not necessarily have to be located exactly at the same point of mean velocity. However, tests have shown that, if they are located in this manner, extremely accurate correlation of the mean velocities of the high and low pressures is obtained providing highly desirable overall results regardless of changes in velocity profiles and flow rates. Various methods and means of averaging the pressures sensed, such as averaging annuli or external pipe rings which are well known in the art, can be utilized in conjunction with a plurality of forms, if even more accurate results are desired.

Figure 3:
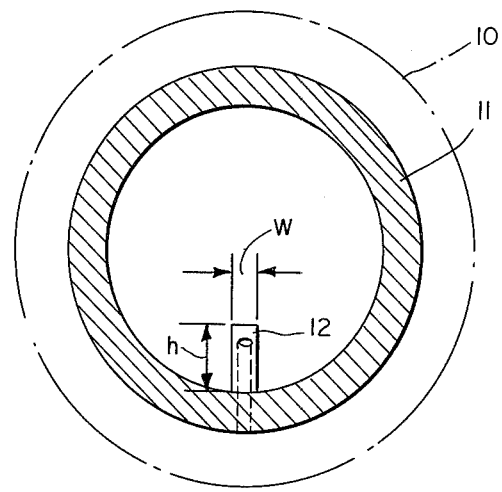
FIG. 3 is an end view of the device shown in FIG. 1.

Differences in the differential pressure of a device having one or more forms, such as that disclosed, can be achieved by simply changing the frontal area of the form, thereby changing the "effective Beta ratio." For example, when viewed as in FIG. 3 it is apparent that the inside diameter of the conduit or bushing 11 can be used to calculate the cross-sectional area thereof. If, from this cross-sectional area (the minuend), the total frontal area of the form (the subtrahend) as shown in FIG. 3, is subtracted, and then the value of the area (or remainder) so obtained is divided by the cross-sectional area of the conduit, this will represent the "effective" Beta ratio. Thus, if the width or length aspect of the form were changed so as to be made wider or narrower and/or higher or lower, the frontal area and the "effective" Beta ratio would be changed accordingly. Therefore, for a given conduit diameter, it is possible to vary the differential pressure output as a function of the frontal area of the forms and since the effective Beta ratio is a function of the frontal area of the form, it would also vary accordingly. Therefore, it is possible to determine, in accordance with my invention, a form or orientation of a form or the proper tap locations which will produce an accurate, differential pressure output and a satisfactory overall performance for a given pipe size, flow rate and specific application.

Since the form is non-annular, it represents only a slight obstruction or restriction to fluid flow. Therefore, the head loss is extremely low or practically negligible. Also, it will measure a specific and exact fraction of the total flow through the conduit.

Referring to FIG. 2, form 12 in the orientation shown can utilize corner tap 22 (rather than 16) in conjunction with low pressure tap 18, if the flow is in normal direction. Also, if the flow is in normal direction, static tap 20 (rather than taps 16 or 22) can be used in conjunction with low pressure tap 18. Also, if the direction of flow is reversed, tap 18 can be used as the positive high pressure sensing tap and either tap 16 or 22 can be used to sense the low pressure.

When using a form 25 as shown in FIG. 4 to measure fluid and gas flow rates and to produce differential pressure outputs, the low pressure tap 17 can be located either in the form or in the conduit wall adjacent to it (tap 19). The form 25 has a triangular profile when viewed in a direction transverse to the direction of fluid flow. However, the hypotenuse 26 extends from the inner wall of the conduit downstream to its innermost end. The triangular sides of the form are smooth and parallel and extend generally radially; and the edges and corners are sharp so as to provide a shearing action on the fluid. The high pressure tap 15, FIG. 4, is disposed in the forward facing sloping surface. The sloping surface has been proven by test to average the deviations in velocity profiles caused by upstream conditions, so that it is no longer necessary with this device to be precisely accurate in locating the high pressure tap 15 at the theoretical standard point of mean velocity (although this, of course, is desirable).

An increase or decrease in the angle A' causes corresponding changes in the high pressure output and inverse changes in the low pressure output and resultant corresponding changes in the differential output. These changes can be accomplished without affecting a change in frontal area or effective Beta ratio, if, for example, the height h of the vertical surface is maintained and angle A only is changed. In addition, this device has the capability for varying differential output by changing the width (or length aspect) and/or the height of the form thereby changing the amount of the frontal area of the form causing more or less restriction in the conduit or ring, as described hereinbefore.

Both high and low pressure taps open in the sloping surfaces. As with the device shown in FIG. 4, the lead angle A can be changed to vary the differential pressure output for a given flow rate. However, as long as $h$ (vertical leg height, FIG. 4 and 5) is maintained, frontal area and effective Beta ratio remain unchanged. If this form is used for measurement in "normal" and "reversed" flows with change in signal but, no change in C value and differential output, it must, of course, by symmetrical. However, if it is used to measure flow in one direction only, the angle forming the downstream hypotenuse surface does not necessarily have to coincide with the angle forming the upstream hypotenuse surface. But, the location X of high and low pressure taps 32 and 34 should be approximately the same.

The results which can be obtained by making one or more of the above described changes can be determined empirically and then mathematically after sufficient base data are available. The procedure for obtaining this information as set forth hereinbefore could comprise the steps of:

a. selecting a form of a given geometric configuration;

b. inserting the form so selected into the fluid flow system in operative relation to the conduit;

c. measuring the differential output at a plurality of flow rates and recording the measurements;

d. selecting a second form having the same geometric configuration as the first selected form, but having a different frontal area when viewed in the direction of fluid flow through the conduit;

e. removing the first selected form and inserting the second selected form into said conduit in operative relation thereto and measuring the differential output at a plurality of given flow rates and recording the measurements;

f. selecting a further form having the same geometric configuration as the first two selected, but having a different frontal area than the first two selected when viewed in the direction of fluid flow through said conduit;

g. inserting the further selected form into the conduit in place of the second form and again measuring the differential output at a plurality of given flow rates and recording the measurements;

h. correlating the recorded measurements as a function of differential output and frontal area for given flow rates;

i. extrapolating the correlated measurements;

j. and then for a desired differential output for a given flow rate, determining the frontal area of a form of the same geometric configuration to be used in the system to produce such differential output.

Having done this, one could predetermine the differential output in the fluid flow system of a differential pressure producing device, by inserting a form having the last mentioned frontal area and configuration into the system in operative relation thereto.

In the same manner, I have disclosed herein a method of selectively predetermining the differential output in a fluid flow system of a differential pressure producing fluid flow device in a conduit in the system, which device provides a restriction to fluid flow in the conduit, which restriction comprises at least one non-annular form connected to and extending inwardly from the wall of the conduit, the form having a surface which, when viewed in profile transverse to the direction of fluid flow in the conduit, extends inwardly at an angle to the surface of the conduit downstream to its innermost end, comprising the steps of:

a. selecting a form of a given geometric configuration and size;
b. inserting the form so selected into the system in operative relation to the conduit with the angle of the form positioned as aforesaid;
c. measuring the differential output of the device at a plurality of flow rates and recording the measurements;
d. selecting a second form having the same geometric configuration as the first selected form, but having a surface, which when viewed in profile transverse to the direction of fluid flow in the conduit, extends inwardly at a different angle to the surface of the conduit than the first selected form, the surface extending downstream to its innermost end;
e. removing the first selected form and inserting the second selected form into the conduit in operative relation thereto and measuring the differential output of the device at a plurality of given flow rates and recording the measurements;
f. selecting a further form having the same geometric configuration as the first two selected, but having a different angle when viewed in profile transverse to the direction of fluid flow through the conduit;
g. inserting the further selected form into the conduit in place of the second form and again measuring the differential output of the device at a plurality of given flow rates and recording the measurements;
h. correlating the recorded measurements as a function of differential output and angle for given flow rates;
i. extrapolating the correlated measurements;
j. and then for a desired differential output for a given flow rate, determining the angle of a form of the same geometric configuration to be used in the system to produce such differential output;
k. then inserting a form having the last mentioned angle and configuration into the system in operative relation thereto.

Figure 5:
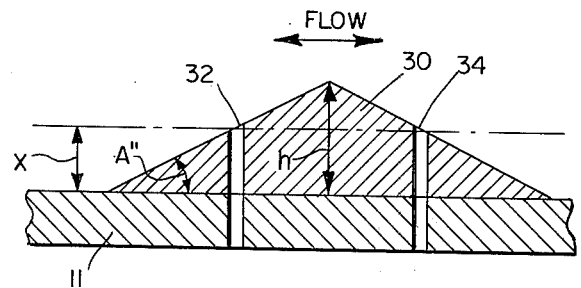
FIG. 5 is an elevational view of another form illustrating another device in accordance with an embodiment of my invention.

With forms as shown in FIGS. 2, 4 and 5 it is possible to selectively predetermine the effective Beta ratio, the differential output and overall performance characteristics desired by selecting the configuration of the obstructions in the conduit, their width and height, their orientation, the angle of the hypotenuse and the proper combination of multiple or singular high and low pressure taps.

My invention provides numerous methods allowing a manufacturer of proportional differential pressure producing fluid flow devices to determine in advance the best embodiment for the overall performance he wishes to achieve for a given application. He can then select and determine the means for accurately measuring a selected fraction of the total flow; which means can be inserted into the main flow path or conduit thereby eliminating the need for conduit branch lines and shunts, and auxiliary meters of the completely annular constricted type. This means is a pressure sensing form.

In accordance with the present invention it is possible to select the size, configuration, orientation, and pressure tap locations of the pressure sensing form to produce the desired differential pressure output and functional characteristics in a differential pressure producing fluid flow device for a given pipe size, flow rate, application and flow media. Such devices will comprise at least one and preferably a plurality of forms disposed generally radially inwardly from the inner wall of a conduit to be inserted in a fluid flow system. Each of the forms has a transverse area representing a restriction or obstruction to flow in the conduit and referred to herein as the "frontal area." This transverse frontal area, the exact configuration and orientation of the forms, pressure tap locations, and angle of convergence can be accurately predetermined empirically and then mathematically before insertion of the form into the conduit, to produce very predictable and highly accurate results.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth about is intended to provide a non-legal technical statement of the contents of the disclosure in compliance with the Rules of Practice of the United States Patent Office, and is not intended to limit the scope of the invention described and claimed herein.

What is claimed is:
1. A method of selectively predetermining the differential output in a fluid flow system of a differential pressure producing fluid flow device in a conduit in said system, which device provides a restriction to fluid flow in said conduit, which restriction comprises at least one non-annular form connected to and extending inwardly from the wall of said conduit, comprising the steps of:
a. selecting a form of a given geometric configuration;
b. inserting the form so selected into said system in operative relation to said conduit;
c. measuring the differential output of said device at a plurality of flow rates and recording said measurements;
d. selecting a second form having the same geometric configuration as the first selected form, but having a different frontal area when viewed in the direction of fluid flow through said conduit;
e. removing the first selected form and inserting the second selected form into said conduit in operative relation thereto and measuring the differential output of said device at a plurality of given flow rates and recording said measurements;
f. selecting a further form having the same geometric configuration as the first two selected, but having a different frontal area than the first two selected when viewed in the direction of fluid flow through said conduit;
g. inserting said further selected form into said conduit in place of said second form and again measuring the differential output of said device at a plurality of given flow rates and recording said measurements;
h. correlating the recorded measurements as a function of differential output and frontal area for given flow rates;
i. extrapolating the correlated measurements;
j. and then for a desired differential output for a given flow rate, determining the frontal area of a form of the same geometric configuration to be used in said system to produce such differential output;

k. then inserting a form having said last mentioned frontal area and configuration into said system in operative relation thereto.

2. A method of selectively predetermining the differential output in a fluid flow system of a differential pressure producing fluid flow device in a conduit in said system, which device provides a restriction to fluid flow in said conduit, which restriction comprises at least one non-annular form connected to and extending inwardly from the wall of said conduit, said form having a surface which, when viewed in profile transverse to the direction of fluid flow in said conduit, extends inwardly at an angle to the surface of said conduit downstream to its innermost end, comprising the steps of:

a. selecting a form of a given geometric configuration and size;
b. inserting the form so selected into said system in operative relation to said conduit with the angle of said form positioned as aforesaid;
c. measuring the differential output of said device at a plurality of flow rates and recording said measurements;
d. selecting a second form having the same geometric configuration as the first selected form, but having a surface, which when viewed in profile transverse to the direction of fluid flow in said conduit, extends inwardly at a different angle to the surface of said conduit than said first selected form, said surface extending downstream to its innermost end;
e. removing the first selected form and inserting the second selected form into said conduit in operative relation thereto and measuring the differential output of said device at a plurality of given flow rates and recording said measurements;
f. selecting a further form having the same geometric configuration as the first two selected, but having a different angle when viewed in profile transverse to the direction of fluid flow through said conduit;
g. inserting said further selected form into said conduit in place of said second form and again measuring the differential output of said device at a plurality of given flow rates and recording said measurements;
h. correlating the recorded measurements as a function of differential output and angle for given flow rates;
i. extrapolating the correlated measurements;
j. and then for a desired differential output for a given flow rate, determining the angle of a form of the same geometric configuration to be used in said system to produce such differential output;
k. then inserting a form having said last mentioned angle and configuration into said system in operative relation thereto.

3. A method of selectively predetermining the differential output in a fluid flow system of a differential pressure producing fluid flow device in a conduit in said system, which device provides a restriction to fluid flow in said conduit, which restriction comprises at least one non-annular form connected to and extending inwardly from the wall of said conduit, said form having a surface which, when viewed in profile transverse to the direction of fluid flow in said conduit, extends inwardly at an angle to the surface of said conduit downstream to its innermost end, comprising the steps of:

a. selecting a form of a given geometric configuration and size;
b. inserting the form so selected into said system in operative relation to said conduit with the angle of said form positioned as aforesaid;
c. measuring the differential output of said device at a plurality of flow rates and recording said measurements;
d. selecting a second form having the same geometric configuration as the first selected form, but having a different frontal area when viewed in the direction of fluid flow through said conduit, and having a surface, which when viewed in profile transverse to the direction of fluid flow in said conduit, extends inwardly at a different angle to the surface of said conduit than said first selected form, said surface extending downstream to its innermost end;
e. removing the first selected form and inserting the second selected form into said conduit in operative relation thereto and measuring the differential output of said device at a plurality of given flow rates and recording said measurements;
f. selecting a further form having the same geometric configuration as the first two selected, but having a different frontal area than the first two selected when viewed in the direction of fluid flow through said conduit and having a different angle when viewed in profile transverse to the direction of fluid flow through said conduit;
g. inserting said further selected form into said conduit in place of said second form and again measuring the differential output of said device at a plurality of given flow rates and recording said measurements;
h. correlating the recorded measurements as a function of differential output and frontal area and angle, for given flow rates;
i. extrapolating the correlated measurements;
j. and then for a desired differential output for a given flow rate, determining the frontal area of a form of the same geometric configuration, and the angle of a form of the same geometric configuration, to be used in said system to produce such differential output; and
k. then inserting a form having said last mentioned frontal area and angle and configuration into said system in operative relation thereto.

4. A method of selectively predetermining the differential output in a fluid flow system of a differential pressure producing fluid flow device in a conduit in said system, which device provides a restriction to fluid flow in said conduit, which restriction comprises at least one non-annular form connected to and extending inwardly from the wall of said conduit, comprising the steps of:

a. selecting a form of a given geometric configuration having surfaces, which when viewed transverse to the direction of fluid flow in said conduit, present a profile which is different from one position to another, depending on the orientation of the form with respect to fluid flow;
b. inserting the form so selected into said system in operative relation to said conduit;
c. measuring the differential output of said device at a plurality of flow rates and recording said measurements;
d. reorienting said form with respect to said fluid flow so that it presents a different profile when viewed transverse to the direction of fluid flow through said conduit;

e. measuring the differential output of said device at a plurality of given flow rates and recording said measurements;

f. again reorienting said form so that it presents a different profile when viewed transverse to the direction of fluid flow through said conduit;

g. again measuring the differential output of said device at a plurality of given flow rates and recording said measurements;

h. correlating the recorded measurements as a function of differential output and orientation for given flow rates;

i. extrapolating the correlated measurements;

j. and then for a desired differential output for a given flow rate, determining the orientation of the form to be used in said system to produce such differential output;

k. then inserting said form in said last mentioned position with respect to fluid flow, into said system in operative relation thereto.

* * * * *